US012757002B2

(12) United States Patent
Wellens et al.

(10) Patent No.: US 12,757,002 B2
(45) Date of Patent: Oct. 6, 2026

(54) MODULAR TELEMATICS CONTROL UNIT AND AUTOMOTIVE VEHICLE EQUIPPED WITH SUCH A TELEMATICS CONTROL UNIT

(71) Applicant: VALEO COMFORT AND DRIVING ASSISTANCE, Créteil (FR)

(72) Inventors: Matthias Wellens, Creteil (FR); Hubert Gleich, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 301 days.

(21) Appl. No.: 18/559,236

(22) PCT Filed: Apr. 29, 2022

(86) PCT No.: PCT/EP2022/061590
§ 371 (c)(1),
(2) Date: Nov. 6, 2023

(87) PCT Pub. No.: WO2022/233741
PCT Pub. Date: Nov. 10, 2022

(65) Prior Publication Data

US 2024/0244413 A1 Jul. 18, 2024

(30) Foreign Application Priority Data

May 4, 2021 (EP) .................................... 21172095

(51) Int. Cl.
*H04W 4/90* (2018.01)
*H04L 67/12* (2022.01)
*H04W 88/06* (2009.01)

(52) U.S. Cl.
CPC ............... *H04W 4/90* (2018.02); *H04L 67/12* (2013.01); *H04W 88/06* (2013.01)

(58) Field of Classification Search
CPC .......... H04W 24/00; H04W 4/90; H04L 67/12
(Continued)

(56) References Cited

U.S. PATENT DOCUMENTS

2003/0224840 A1* 12/2003 Frank .................. H04M 1/6091 455/575.9
2006/0152387 A1* 7/2006 Ringel .................. H04W 8/265 340/539.18

(Continued)

FOREIGN PATENT DOCUMENTS

CN 104919785 A 9/2015
DE 102019109100 A1 10/2020

(Continued)

OTHER PUBLICATIONS

International Search Report and Written Opinion in corresponding International Application No. PCT/EP2022/061590, dated Oct. 19, 2022 (10 pages).

(Continued)

*Primary Examiner* — Maria El-Zoobi
(74) *Attorney, Agent, or Firm* — Osha Bergman Watanabe & Burton LLP

(57) ABSTRACT

A telematics control unit for an automotive vehicle is disclosed. The telematics control unit includes a first and second communication module. The first communication module includes a first network device configured to perform emergency calls and a first data interface configured to exchange data with an automotive vehicle computer system. The second communication module includes a second network access device configured to exchange data with a telecommunication network and a dedicated communication interface between the first communication module and the second communication module. The first and second com-
(Continued)

Figure 1:
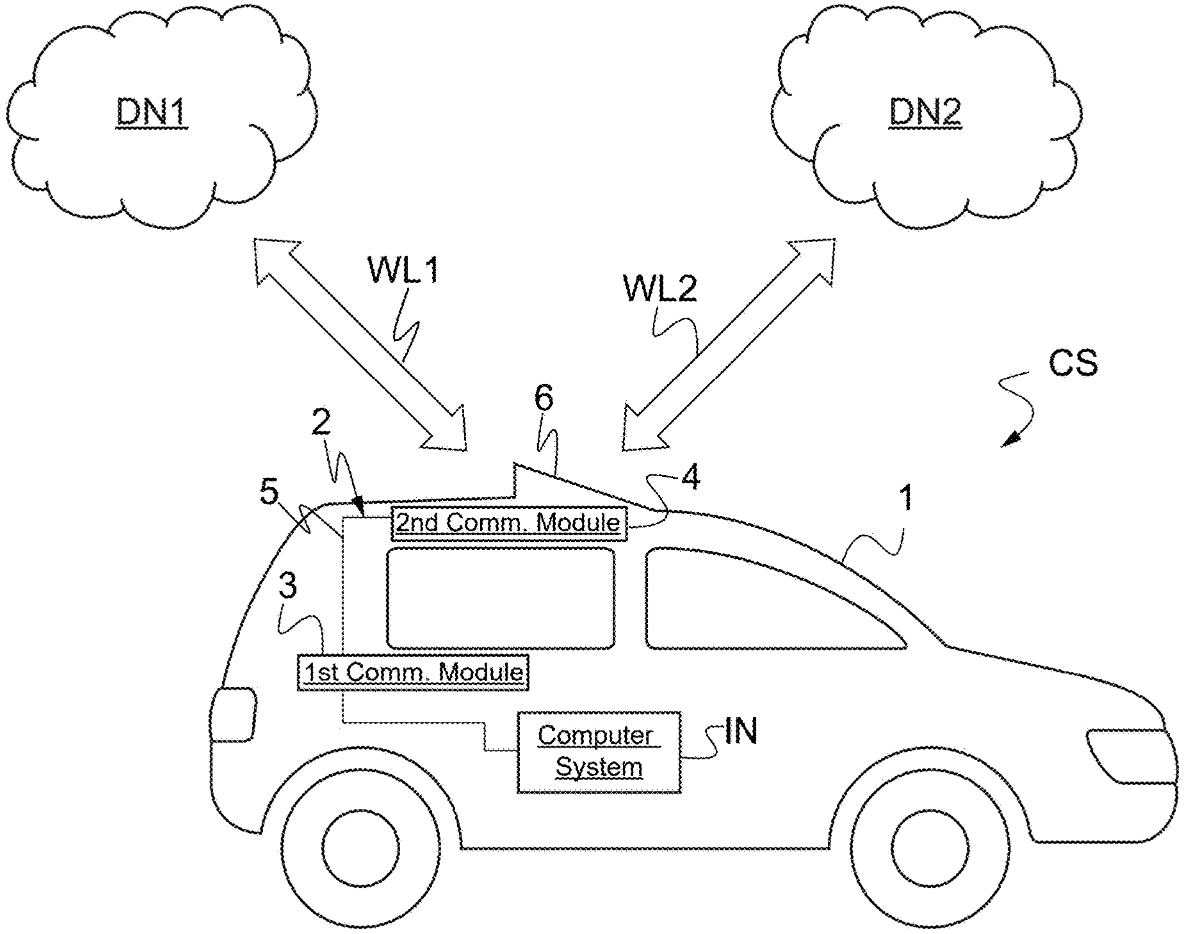

munication modules are configured to communicate through the dedicated communication interface.

14 Claims, 3 Drawing Sheets

(58) Field of Classification Search
USPC ....................................................... 455/404.1
See application file for complete search history.

(56) References Cited

U.S. PATENT DOCUMENTS

| | | | | |
|---|---|---|---|---|
| 2014/0087680 | A1* | 3/2014 | Luukkala ................ | H04W 4/90 455/404.1 |
| 2015/0342542 | A1* | 12/2015 | An .................... | H04M 1/72421 600/549 |
| 2016/0197783 | A1* | 7/2016 | Hort ........................ | H04W 4/40 709/222 |
| 2016/0344747 | A1* | 11/2016 | Link, II ............. | G07C 9/00182 |
| 2020/0389469 | A1* | 12/2020 | Litichever ............. | H04W 12/12 |

FOREIGN PATENT DOCUMENTS

| | | | | |
|---|---|---|---|---|
| WO | WO2013/086244 | * | 12/2012 | ............ H04W 24/00 |
| WO | 2013-086244 | A1 | 6/2013 | |

OTHER PUBLICATIONS

Office Action issued by the CNIPA for corresponding Chinese Patent Application No. 202280032179.1, mailed May 13, 2026 (18 pages).

* cited by examiner

MODULAR TELEMATICS CONTROL UNIT AND AUTOMOTIVE VEHICLE EQUIPPED WITH SUCH A TELEMATICS CONTROL UNIT

TECHNICAL FIELD OF THE INVENTION

The invention relates to telecommunications, and in particular to telecommunication devices in the automotive industry.

More precisely the invention relates to a telematics control unit and to an automotive vehicle equipped with such a telematics control unit.

BACKGROUND INFORMATION AND PRIOR ART

A telematics control unit (TCU) is a telecommunication device embedded in a vehicle and which is configured to perform telecommunication operations, for instance voice calls or emergency calls (eCall). An eCall is automatically triggered in case of a collision of the vehicle, and intended to bring assistance to the driver involved in an accident. In order to ensure an emergency assistance after any kind of accident, the TCU is usually located in a crash-safe area of the vehicle.

Some TCU are further configured to provide other telecommunication services, for instance Internet access. Such telecommunications involving radiofrequencies, TCU should be as close as possible to the antenna of the vehicle, which is usually a roof antenna. Therefore, when the roof of the vehicle is crash safe, the TCU is located under the roof antenna.

SUMMARY OF THE INVENTION

According to an aspect of the invention, it is provided a telematics control unit for an automotive vehicle comprising a first communication module comprising a first network access device configured to perform emergency calls and a first data interface configured to exchange data with an automotive vehicle computer system, a second communication module comprising a second network access device configured to exchange data with a telecommunication network, a dedicated communication interface between the first communication module and the second communication module, the first communication module and the second communication module being configured to communicate through the dedicated communication interface.

Thanks to the invention, the first communication module is adapted to be located in a first location in the vehicle, for instance in a crash safe area of the vehicle, and the second communication module is adapted to be located in a second location of the vehicle, for instance near the roof antenna. The telematics control unit is therefore distributed on the vehicle 1 which allows the TCU to comply with several requirements, for instance the protection against collision and a sufficient proximity with an antenna.

According to an embodiment of the invention, the first communication module and the second communication module are configured to communicate through the dedicated communication interface according to a master/slave protocol, the first communication module being the master entity and the second communication module being the slave entity.

Thanks to the master/slave protocol, a vehicle may interface with the first communication module only, the communication between the vehicle and the second communication module being controlled by the first communication module. Therefore, the invention is compatible with prior art vehicles which are configured to interface with a TCU having only one communication module.

According to an embodiment of the invention, the dedicated communication interface is configured to ensure a communication between the first communication module and the second communication module over a distance up to 15 meters.

According to an embodiment of the invention, the dedicated communication interface is a 1000BASE-T1 interface compliant with the IEEE 802.3 bp standard. A 1000BASE-T1 interface is a Gigabit Ethernet interface which allows a speed of 1000 Mbit/s over a distance up to 15 metres. Moreover, this type of interface is particularly suitable to vehicles since it allows the use of unshielded cables and has lower electromagnetic compatibility (EMC) requirement.

According to an embodiment of the invention, the dedicated communication interface is a USB (Universal Serial Bus) interface.

A USB interface is suitable for exchanging data over shorter distances, for instance distances of few metres depending on the USB version.

According to an embodiment of the invention, the telematics control unit comprises a power supply providing electrical power to both the first communication module and the second communication module.

According to an embodiment of the invention, the power supply is located in the first communication module.

According to an embodiment of the invention, the second communication module comprises a satellite navigation module.

According to an embodiment of the invention, the first communication module is configured to perform emergency calls through at least one antenna, said at least one antenna being located in the second communication module.

According to an embodiment of the invention, the first communication module is configured to perform emergency call through at least one antenna, said at least one antenna being located outside the first communication module and outside the second communication module.

According to an embodiment of the invention, the first communication module comprises a backup antenna, the first configuration module being able to perform emergency calls through the back-up antenna.

According to an embodiment of the invention, the second communication module comprises a second data communication interface configured to exchange data with the automotive vehicle computer system.

According to an embodiment of the invention, the first communication module comprises a first SIM card associated to the first network access device.

According to an embodiment of the invention, the first communication module comprises a second SIM card associated to the second network access device, the telematics control unit being further configured for the second network access device to access to the second SIM card using the dedicated communication interface.

According to an embodiment of the invention, the second communication module comprises a second SIM card associated to the second network access device.

According to another aspect, it is provided an automotive vehicle equipped with a telematics control unit according to the invention.

According to an embodiment of the invention, the first communication module is located in a crash-safe area of the vehicle and/or the second communication module is located outside said crash-safe area.

According to an embodiment of the invention, the crash-safe area is located between rear seats and a trunk of the automotive vehicle, or below different seats in the passenger compartment.

DETAILED DESCRIPTION OF EXAMPLE(S)

The following description with reference to the accompanying drawings will make it clear what the invention consists of and how it can be achieved. The invention is not limited to the embodiments illustrated in the drawings. Accordingly, it should be understood that, where features mentioned in the claims are followed by reference signs, such signs are included solely for the purpose of enhancing the intelligibility of the claims and are in no way limiting on the scope of the claims.

Figure 2:
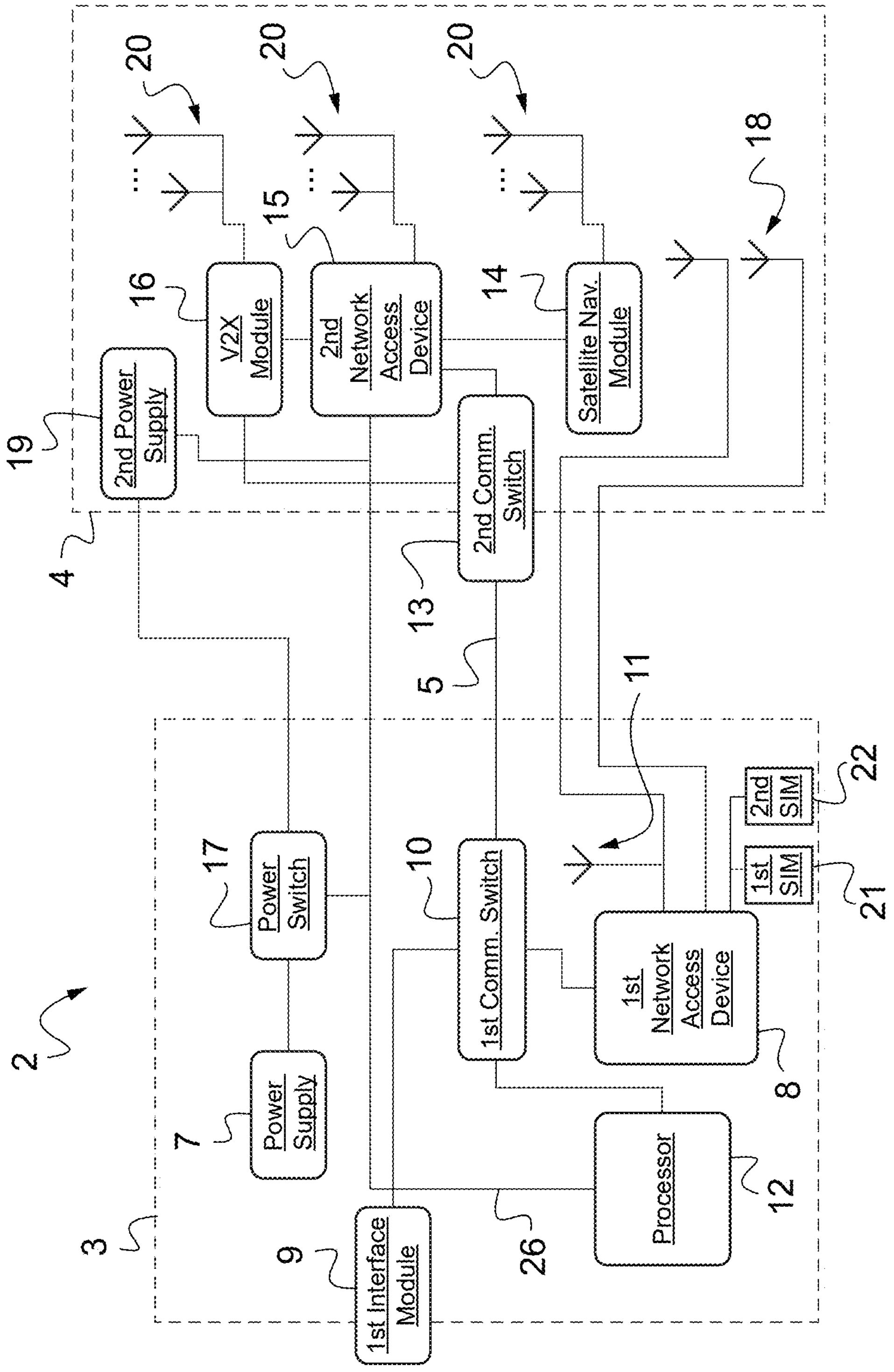
Figure 3:
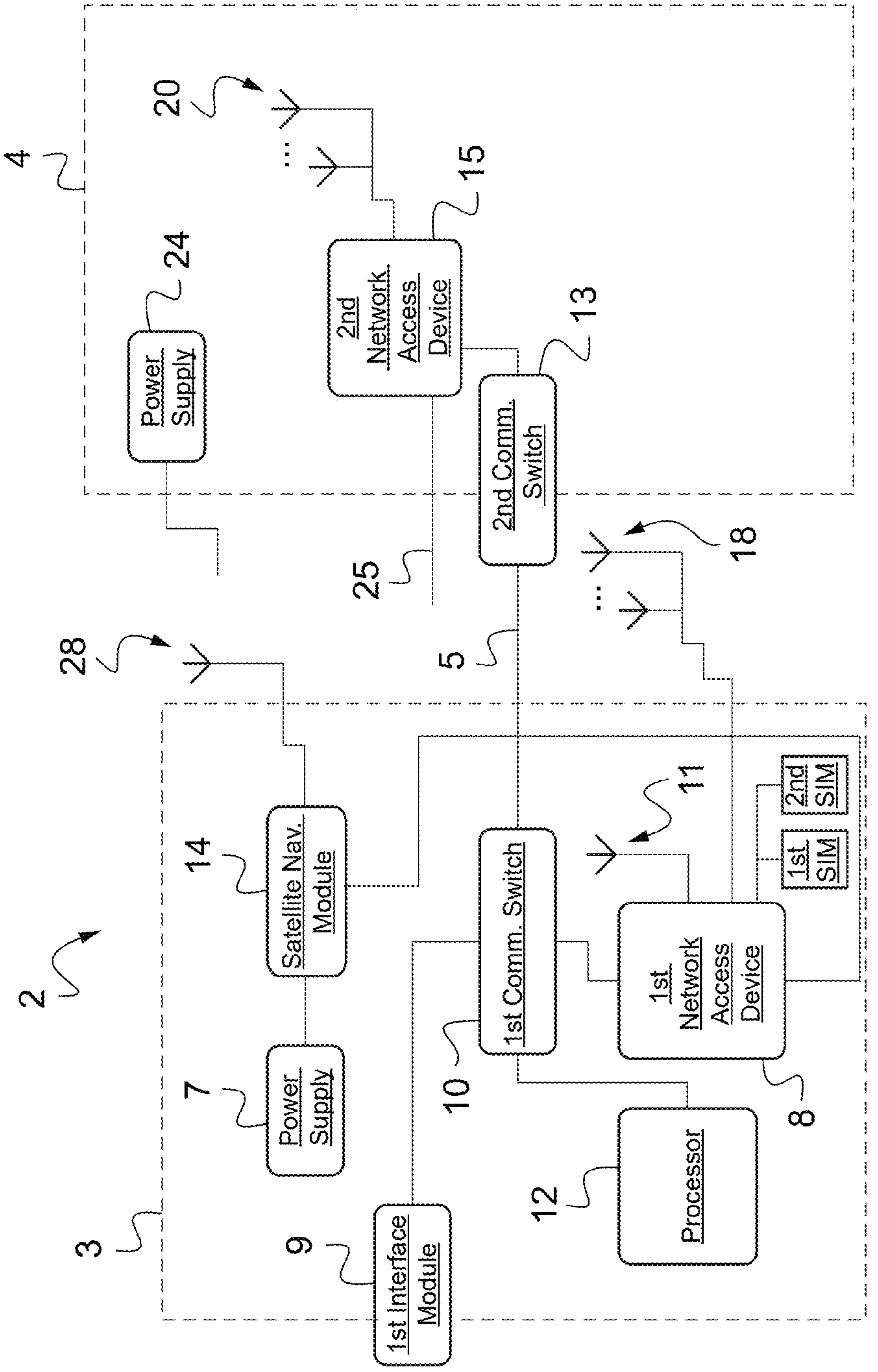

In the accompanying drawings:

FIG. 1 shows a communication system comprising an automotive vehicle equipped with a telematics control unit according to an embodiment of the invention, FIG. 2 is a diagram representative of a telematics control unit according to an embodiment of the invention, FIG. 3 is a diagram representative of a telematics control unit according to another embodiment of the invention.

A communication system CS comprising an automotive vehicle 1, here a car, equipped with a telematics control unit 2 according to the invention is shown in FIG. 1. The communication system CS further comprises a first remote telecommunication network DN1 with which the automotive vehicle 1 (by means of the telematics control unit 2) is able to establish a first wireless communication link WL1, and a second remote telecommunication network DN2 with which the automotive vehicle 1 (by means of the telematics control unit 2) is able to establish a second wireless communication link WL2.

The telematics control unit 2 of this example comprises two communication modules. A first communication module 3 is configured to perform primarily emergency call (eCall), here through the first remote telecommunication network DN1, and a second communication module 4 is configured to provide primarily Internet access, here by connecting to the second remote telecommunication network DN2, for instance in order to download navigation data such as GPS (Global Positioning System) maps.

The first communication module 3 and the second communication module 4 communicate through a dedicated communication interface 5 through which all, or at least most of, the communications, between the two modules 3 and 4 pass.

The first communication module 3 and the second communication module 4 are located in two different locations of the vehicle 1. The telematics control unit 2 is therefore distributed in the vehicle 1. In this embodiment, the first communication module 3 is located in a crash-safe location of the vehicle 1, for instance here in the rear part of the vehicle interior, here in the trunk of the vehicle 1. The second communication module 4 is located close to a roof antenna system 6 of the vehicle, here a fin antenna system, and more precisely here under the roof antenna system 6. In the present example, the second communication module 4 is not in a crash-safe location of the vehicle 1.

Here, the first communication module 3 and the second communication module 4 are located in such way that the data they exchange travel a distance between 1 and 15 meters, for instance here a distance of about four metres.

The automotive vehicle 1 is equipped with a computer system IN comprising and linking together various electronics units (for instance, command units, displays, sensors . . . ) of the vehicle 1, among which the telematics control unit 2. Therefore, the telematics control unit 2 may communicate with the computer system IN of the automotive vehicle and data may be exchanged between the computer system IN and either one of the remote telecommunication networks DN1 and DN2.

In this embodiment, the telematics control unit 2 communicates with the computer system IN through the first communication module 3 and the communications between the computer system IN and the second communication module 4 pass through the first communication module 3.

FIG. 2 is a detailed diagram illustrating the architecture of the telematics control unit 2 of FIG. 1.

In this embodiment, the dedicated communication interface 5 is configured to provide a communication speed up to 1000 megabits per second. For instance, the dedicated communication interface 5 comprises a 1000BaseT1 link over a single unshielded twisted pair of wires, compliant with the gigabit Ethernet standard for automotive and industrial applications IEEE Std 802.3 bp. Such a communication interface is able to transmit data over a distance of up to 15 metres.

Here, the first communication module 3 comprises a power supply 7, a first network access device 8, a first interface module 9, or data interface module, a first communication switch 10, a backup antenna 11 and a processor 12, for instance a microcontroller.

The processor 12 is configured to control and monitor the telematics control unit 2, that is to say to manage the communication between the different elements 8 to 11 of the first communication module 3.

The first communication switch 10 is configured to interface the processor 12 with the other elements 8, 9, 10 and 12 of the first communication module 3, and to interface the first communication module 3 with the second communication module 4.

The power supply 7 is configured to provide electricity to the first communication module 3.

The first network access device 8 is configured to establish the first communication link WL1 with the first remote telecommunication network DN1. More precisely, the first network access device 8 is configured to perform cellular communications, for instance 4G telecommunications, and in particular here to perform eCall operations. For instance here, the first network access device 8 is a dual SIM device, that is to say it is compatible with the use of two SIM cards.

A SIM (Subscriber Identity Module) is an integrated circuit configured to identify and authenticate a user towards a telecommunication network. To this end, a SIM card comprises a telecommunication profile stored in a memory. It also enables secure and encrypted communications via the telecommunication network. A SIM may be embedded (eSIM), that is to say soldered to an electronic circuit, for instance here the TCU mainboard, or removable. A SIM may be used in many telecommunications involving a user, for instance phone calls, or in machine-to-machine communications (M2M).

In this example, the first network access device 8 is equipped with a first SIM card 21 proper to the vehicle 1, associated to the first remote telecommunication network DN1 and configured to establish the eCalls communication, and a second SIM card 22, or customer SIM card, associated to the second remote telecommunication network DN2. The customer SIM card 22 is configured to access a mobile network to which an end customer of the vehicle 1 subscribes, here the second remote telecommunication network DN2. The first SIM card 21 is for instance an embedded SIM, and the second SIM card 22 is for instance an removable SIM card provided by the end customer of the vehicle 1 via a SIM tray located outside the first communication module 3 and the second communication module 4.

The first network access device 8 is connected to a main antenna 18 and to the back up antenna 11 and is configured to perform eCalls either through the main antenna 18 or, in case of a failure of the main antenna 18, through the backup antenna 11. The main antenna 18 is located outside the first communication module 3, in a location of the vehicle which is suitable to emissions and receptions of radio-communication signals. For instance, the main antenna 18 is located in the second communication module 4, more specifically here on the roof of the vehicle 1. The backup antenna 11 is located in the first communication module 3, which is located in a crash-safe location so as to be protected against collisions.

The first interface module 9 is configured to exchange data with the vehicle computer system IN. All the communications between the first and second communication modules 3, 4 of this example and the vehicle computer system IN pass through the interface module 9.

The first communication module 3 and the second communication module 4 communicate here according to a master/slave protocol, in which the first communication module 3 is the master and the second communication module 4 is the slave.

In this embodiment, the second communication module 4 comprises a second communication switch 13, a satellite navigation module 14, a second network access device 15, a V2X (Vehicle-to-Everything) module 16 and a second power supply 19.

The second communication switch 13 is configured to interface the element 14, 15, 16 of the second communication module 4 with the first communication module 3.

Since the satellite navigation module 14 of this embodiment is not in a crash-safe location, the positioning data determined by the satellite navigation module 14 and transmitted from the second communication module 4 to the first communication module 3 are saved continuously by the first communication module 3, so that in case of a failure of the satellite navigation module 14, for instance during a crash, the first communication module 3 may use the saved positioning data in the eCall operations.

The second network access device 15 is configured to establish the second communication link WL2 with the second remote telecommunication network DN2. More precisely, the second network access device 15 is configured to perform cellular communications, for instance 5G communications, and in particular here to access the Internet network. In this embodiment, the second network access device 15 is compatible with more advanced MIMO methods (Multiple-Input, Multiple Output) supporting higher radiofrequencies, for instance radiofrequencies up to 5 GHz, compared to the first network access device 8.

Although the SIM cards 21 and 22 are both located in the first communication module, and although the first network access device 8 is preferably configured to communicate with the first remote telecommunication network DN1 and the second network access device 15 is preferably configured to communicate with the second remote telecommunication network DN2, the profile of each of the SIM cards 21 and 22 may be shared with any of the first and second network access device 8 and 15.

An advantage of having the two SIM cards 21, 22 in the same network access device, here in the first network access device 8, is that it is possible to choose the telecommunication profile of which card is shared with the second network access device 15 and to dynamically change the shared profile according to different factors. For instance, if the second SIM card 22 (customer SIM card) is not connected to the first network access device 8, then the profile of the first SIM card 21 will be shared with the second network access device 15. When the end customer of the vehicle connects the second SIM card 22 to the first network access device 8, the profiles may be switched, i.e. the profile of the first SIM card may be shared with the second network access device 15 instead of the profile of the second SIM card 22.

The first network access device 8 is configured to provide access to SIM details to the second network access device 15 via remote SIM access techniques such as the remote SIM Access Profile (rSAP).

Since the second SIM card 22 is located in the first communication module, the second remote telecommunication network DN2 is configured to access to the second SIM card 22 via the dedicated communication interface 5.

The V2X module 16 is a communication module configured to establish a direct and wireless communication with the road infrastructure and with other road users, for instance other vehicles, pedestrians, bicycles, etc.

In this embodiment, the satellite navigation module 14, the second network access device 15 and the V2X module 16 are each connected to their own antenna subsystem 20. A subsystem of two antennas constitutes here the main antenna 18 of the first network access device 3 and is directly connected to the first network access device 1. Here, all the antenna subsystems 18 and 20 form the antenna system 6 previously mentioned in connection with FIG. 1.

In the present embodiment, the power supply 7 supplies power to the second communication module 4 through the second power supply 19 controlled by the power switch 17.

Since the processor 12 controls the power switch 17, it controls the power supply of the second communication module 4. Therefore, in some case, for instance during parking scenarios, the power supply to the second communication module 4 could be switched off to reduce standby power consumption of the whole telematics control unit 2 and to prevent any waste of power due to a wake up signal that was sent by mistake or due to malicious modification to the vehicle.

In other embodiments, the telematics control unit 2 is implemented without the power switch 17. In such embodiments, the second communication module 4 is continuously powered, for instance even during parking scenarios. A separate wake-up signal may be required to trigger the bootup of the second telecommunication module 4, e.g., via the direct communication link (wake-on-LAN).

The first communication switch 10 of the first communication module 3 and the second communication switch 13 of the second communication module 4 are mutually connected through the dedicated communication interface 5.

The telematics control unit 2 further comprises a control link 26 between the processor 12 and several elements of the telematics control unit, for instance here the power switch 17, the power supply 19 and the second network access device 4. The processor 12 controls operation of at least part of the second communication module 4 through the control link 26. In this embodiment, the control link 26 is based on a low speed input/output link, for instance a UART (Universal Asynchronous Receiver-Transmitter). In other embodiments, the control link 26 only comprises direct 1/O lines. It primarily controls the operational states (active, standby, switched off, etc.) of the different components.

FIG. 3 shows another embodiment of the telematics control unit 2 according to the invention. In this embodiment, the second communication module 4 comprises a minimal configuration. For instance here, the second communication module 4 comprises solely the second network access device 15, the second communication interface 13, and a dedicated power supply 24.

In this embodiment, the telematics control unit 2 comprises the satellite navigation module 14, which is located in the first communication module 3. In other embodiments of the invention, the telematics control unit 2 does not comprise any satellite navigation module. The satellite navigation module 14 of this embodiment is associated with an external antenna subsystem 28, located outside the first communication module and outside the second communication module.

Here, the main antenna 18 of the first network access device 8 is an external antenna and is located outside the first communication module 3 and outside the second communication module 4.

In this embodiment, each of the first communication module 3 and the second communication module 4 has its own power supply module. Therefore, the first communication module 3 is powered by a first power supply 23 and the second communication module is powered by the dedicated power supply 24.

The second communication module 4 comprises here a direct link 25 with the vehicle computer system IN. Here, the direct link 25 is a direct connection between the second network access device 15 and the vehicle computer system IN. Therefore, the direct link 23 may be used in parallel or instead of the dedicated communication interface 5, for instance to reduce the load on the first communication module 3.

The invention is not limited to the embodiment described above.

It has been described a telematics control unit comprising a first communication module located in the rear part of the vehicle interior and a second communication module located on the roof of the vehicle 1. In other embodiment, the first communication module 3 and the second communication module 4 may be located anywhere in the vehicle, and the man skilled in the art will know how to choose the proper location according to the structure of the vehicle 1.

In the embodiments described above, the first SIM card 21 and the second SIM card 22 are located in the same communication module, here the first communication module. In other embodiments, the two SIM cards are located in two different communication modules. For instance, the first SIM card 21 may be located in the first communication module 3 and the second SIM card 22 may be located in the second communication module 4.

The vehicle 1 described above is a car. However, in other embodiments, the vehicle may be any kind of vehicle, for instance a truck, a bus or a motorcycle.

Furthermore, the invention is not limited to the dedicated communication interface 5 described above, and other embodiments of the invention comprise a dedicated communication interface providing different speed, over a different distance. For instance, the dedicated communication interface may be a USB interface.

The invention claimed is:

1. A telematics control unit for an automotive vehicle comprising:

a first communication module comprising:
  - a first network access device configured to perform emergency calls,
  - a first data interface configured to exchange data with an automotive vehicle computer system; and
  - a first SIM card associated with the first network access device;

a second communication module comprising:
  - a second network access device configured to exchange data with a telecommunication network, and a dedicated communication interface between the first communication module and the second communication module, wherein the first communication module and the second communication module are configured to communicate through the dedicated communication interface;

wherein the first communication module further comprises a second SIM card associated with the second network access device, and wherein the second network access device is configured to access the second SIM card using the dedicated communication interface.

2. The telematics control unit according to claim 1, wherein the first communication module and the second communication module are configured to communicate through the dedicated communication interface according to a master/slave protocol, the first communication module being a master entity and the second communication module being a slave entity.

3. The telematics control unit according to claim 1, wherein the dedicated communication interface is configured to ensure a communication between the first communication module and the second communication module over a distance up to 15 meters.

4. The telematics control unit according to claim 1, wherein the dedicated communication interface is a 1000BaseT1-interface compliant with an IEEE 802.3 bp standard.

5. The telematics control unit according to claim 1, wherein the dedicated communication interface is a USB interface.

6. The telematics control unit according to claim 1, further comprising: a power supply configured to provide electrical power to both the first communication module and the second communication module.

7. The telematics control unit according to claim 6, wherein the power supply is located in the first communication module.

8. The telematics control unit according to claim 1, wherein the second communication module comprises a satellite navigation module.

9. The telematics control unit according to claim 1, wherein the first communication module is configured to perform emergency calls through at least one antenna, wherein the at least one antenna is located in the second communication module.

10. The telematics control unit according to claim 1, wherein the first communication module is configured to perform emergency calls through at least one antenna, wherein the at least one antenna is located outside the first communication module and outside the second communication module.

11. The telematics control unit according to claim 1, wherein the first communication module comprises a backup antenna, wherein the first communication module is able to perform emergency calls through the backup antenna.

12. The telematics control unit according to claim 1, wherein the second communication module comprises a second data communication interface configured to exchange data with the automotive vehicle computer system.

13. An automotive vehicle equipped with a telematics control unit according to claim 1.

14. The automotive vehicle according to claim 13, wherein the first communication module is located in a crash-safe area of the vehicle, and wherein the second communication module is located outside the crash-safe area.

* * * * *